United States Patent [19]
Muramatsu

[11] Patent Number: 6,067,283
[45] Date of Patent: May 23, 2000

[54] OPTICAL PICKUP

[75] Inventor: Eiji Muramatsu, Saitama-ken, Japan

[73] Assignee: Pioneer Electronics Corporation, Tokyo, Japan

[21] Appl. No.: 09/071,808

[22] Filed: May 4, 1998

[30] Foreign Application Priority Data

May 9, 1997 [JP] Japan ..................................... 9-136008

[51] Int. Cl.$^7$ ............................... G02B 5/26; G02B 5/18; G11B 7/135
[52] U.S. Cl. ................... 369/112; 369/44.23; 369/44.37; 369/94; 369/109
[58] Field of Search .......................... 369/112, 13, 44.23, 369/44.37, 54, 58, 110, 118, 44.12, 94, 109; 356/345

[56] References Cited

U.S. PATENT DOCUMENTS

| | | | |
|---|---|---|---|
| 5,303,221 | 4/1994 | Maeda et al. ............................. | 369/112 |
| 5,446,565 | 8/1995 | Komma et al. ............................ | 359/19 |
| 5,526,338 | 6/1996 | Hasman et al. .......................... | 369/109 |
| 5,671,207 | 9/1997 | Park ........................................ | 369/112 |
| 5,699,341 | 12/1997 | Sugi et al. ............................... | 369/112 |
| 5,734,637 | 3/1998 | Ootaki et al. ............................ | 369/112 |
| 5,761,176 | 6/1998 | Takahashi ............................... | 369/109 |
| 5,784,354 | 7/1998 | Lee ......................................... | 369/112 |
| 5,793,734 | 8/1998 | Tsuchiya et al. ....................... | 369/112 |
| 5,828,453 | 10/1998 | Yamamoto et al. .................... | 356/345 |
| 5,835,473 | 11/1998 | Shimozono et al. ................... | 369/112 |

*Primary Examiner*—Tan Dinh
*Assistant Examiner*—Kim-Kwok Chu
*Attorney, Agent, or Firm*—Arent, Fox, Kintner, Plotkin & Kahn

[57] ABSTRACT

An optical pickup is provided for reproducing information recorded on optical recording mediums including a first recording medium having a predetermined first distance from a surface of the medium to an information recording surface, and a second recording medium having a predetermined second distance different from the first distance. A first light source is provided for emitting a first light beam having a first wavelength, and a second light source is provided for emitting a second light beam having a second wavelength. An objective focuses the first light beam on the information recording surface of the first recording medium, and focuses the second light beam on the information recording surface of the second recording medium. A correction means is provided in an optical path between the first and second light sources and the objective for correcting aberrations generated in the second light beam.

8 Claims, 7 Drawing Sheets

FIG.2 a

TRANSMITTING AND REFLECTING
CHARACTERISTICS OF FIRST BEAM SPLITTER

|     |     | 635nm | 785nm |
|-----|-----|-------|-------|
| (1) | Tp  | 90%   | 0%    |
| (2) | Ts  | 0%    | 0%    |
| (3) | Rp  | 10%   | 100%  |
| (4) | Rs  | 100%  | 100%  |

FIG.2 b

TRANSMITTING AND REFLECTING
CHARACTERISTICS OF SECOND BEAM SPLITTER

|     |     | 635nm | 785nm |
|-----|-----|-------|-------|
| (5) | Tp  | 0%    | 100%  |
| (6) | Ts  | 0%    | 0%    |
| (7) | Rp  | 100%  | 0%    |
| (8) | Rs  | 100%  | 100%  |

FIG.4

|  | n=1 | n=1 |
|---|---|---|
|  | $\phi = 2 \times 1 \times \pi$ | $\phi = 2 \times 2 \times \pi$ |
| $\|A_0\|^2$ | 0.681 | 0.135 |
| $\|A_1\|^2$ | 0.129 | 0.351 |

# OPTICAL PICKUP

BACKGROUND OF THE INVENTION

The present invention relates to an optical pickup which is provided in a compatible system for reproducing a CD, CD-Recordable (CD-R), and Digital-Versatile Disc (DVD).

The development of the DVD, which is a high-density recording medium, has come to be much in progress. The DVD has a much larger capacity than the conventional CD so that one whole movie can be recorded on the disc. Under such a circumstance, a compatible reproducing system for reproducing both the CD and the DVD is much sought after.

Comparing the constructions of the DVD and the CD, the distance from the surface of the DVD to the information recording surface, that is the thickness of a protection layer of the disc, is 0.6 mm, which is about half as much as that of the CD. If an optical pickup adapted to converge a light beam at a focal point appropriate for the DVD is used when reproducing a CD, due to the difference in the thickness of the protection layer, there occurs a wave front aberration such as a spherical aberration in the light beam. Hence the converged light beam appropriate for the DVD cannot be accurately applied to the CD.

In addition, the size of information pits formed on the disc for recording information differs in the CD and the DVD. More particularly, the length of the smallest pit formed on the CD is about 0.87 μm, while the length of the smallest pit formed on the DVD is about 0.4 μm. In order to accurately read the information pits, it is necessary to apply a beam spot appropriate for the pit in each disc.

It is further preferable to be able to reproduce a write-once CD-R with the compatible reproducing system. However, the reflectance and absorption characteristics of the material comprising the recording layer of the CD-R depend largely on the wavelength of the applied light beam. Namely, it is necessary to provide a laser diode which emits a light beam having a wavelength about 785 nm for the CD-R. On the other hand, the DVD requires a light beam having a wavelength of 635 nm. Thus, a sufficient reflectance for reading out signals from the CD-R cannot be obtained by the light beam emitted from the laser diode for the DVD. As a result, the CD-R cannot be reproduced.

In order to solve the problem, it suffices to provide a first optical pickup having an appropriate optical characteristics for the DVD and a second optical having an appropriate optical characteristics for the CD and the CD-R. However, the number of parts in such a reproducing system with two pickups is increased, thereby inevitably enlarging the reproducing system and increasing the manufacturing cost thereof.

SUMMARY OF THE INVENTION

An object of the present invention is to provide an optical pickup with which the CD, CD-R and the DVD can be read without increasing the number of parts as possible.

According to the present invention, there is provided an optical pickup for reproducing information recorded on optical recording mediums including a first recording medium having a predetermined first distance from a surface of the medium to an information recording surface, and a second recording medium having a predetermined second distance different from the first distance, comprising, a first light source for emitting a first light beam having a first wavelength, a second light source for emitting a second light beam having a second wavelength, an objective for focusing the first light beam on the information recording surface of the first recording medium, and for focusing the second light beam on the information recording surface of the second recording medium, correction means provided in an optical path between the first and second light sources and the objective for correcting aberrations generated in the second light beam, caused by the difference of the second distance from the first distance.

The correction means has means for generating an aberration for canceling the aberrations generated in the second light beam.

In an aspect of the invention, the correction means is a phase transmission type diffraction grating having a plurality of grooves each having an approximately rectangular cross section, the depth of the groove is in proportion to $\lambda/(N-1)$ where, $\lambda$ is the wavelength, N is the index of refraction.

The correction means may comprise a beam splitter for reflecting the first light beam and for transmitting the second light beam, means for generating an aberration in the second light beam after the transmission of the beam splitter, and an optical element for leading the second light beam from the generating means to the objective.

The correction means may also be an annular slit member for limiting aperture of the second light beam.

These and other objects and features of the present invention will become more apparent from the following detailed description with reference to the accompanying drawings.

BRIEF DESCRIPTION OF DRAWINGS

FIGS. 2a and 2b are tables showing transmittance and reflectance characteristics of beam splitters provided in the pickup of FIG. 1;

FIG. 4 is a table showing intensities of light diffracted by the hologram of FIG. 3;

DETAILED DESCRIPTION OF THE PREFERRED EMBODIMENT

Figure 1:
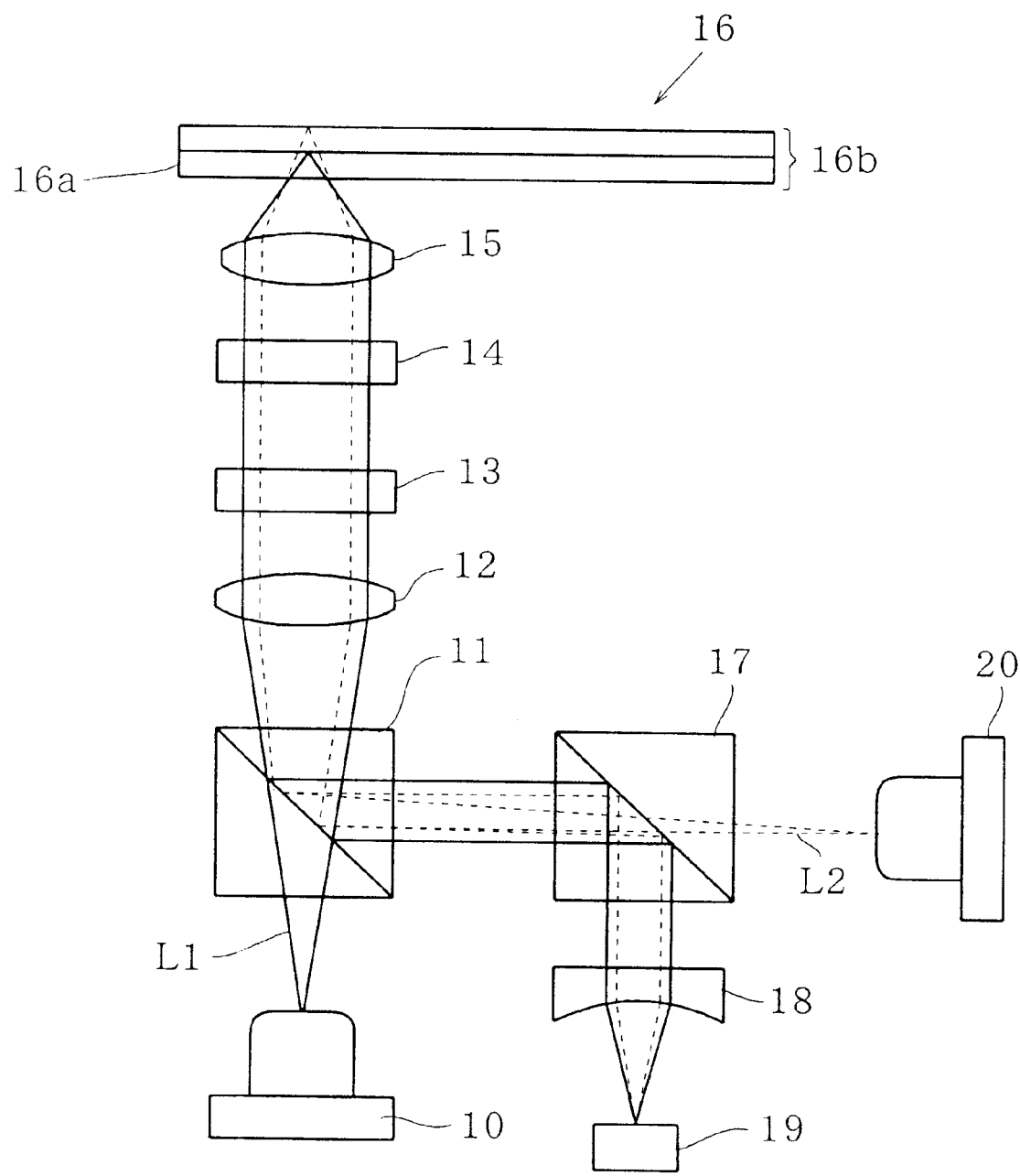
FIG. 1 is a diagram showing an optical pickup according to the present invention.

Referring to FIG. 1. an optical pickup of the present invention comprises has a first laser diode 10, a second laser diode 20 as light sources, a first beam splitter 11, a second beam splitter 17, a collimator lens 12, a quarter wave ($\lambda/4$) plate 13, a hologram 14, an objective 15, a multiple lens device 18 and a photodetector 19. The first laser diode 10 emits a first light beam L1, the optical path of which is shown by the solid line in FIG. 1, the wavelength of which is 635 nm, and the second laser diode 20 emits a second light beam L2 the optical path of which is shown by a dotted line, the wavelength of which is 785 nm.

The light beam from the first laser diode 10 is applied to the first beam splitter 11. The beam splitter 11 is provided with a reflecting film having transmitting and reflecting characteristics of the light beams shown in FIG. 2a. More particularly, the transmittance Tp for a P (parallel) polarized light of the first light beam of 635 nm is 90%, while the reflectance Rp thereof is 10% as shown by references (1) and (3). In the case of S (senkrecht) polarized light, the transmittance Ts is 0% while the reflectance Rs is 100% as shown by the references (2) and (4). Hence only the P polarized light of the first light beam is transmitted through the beam splitter 11.

The light beam from the beam splitter 11 is formed into parallel rays of light by the collimator lens 12, and further applied to a quarter wave plate 13. The quarter wave plate 13 rotates the applied light so that the P polarized light or the S polarized light is converted to a left-handed or right-handed circularized polarized light. The left-handed or right-handed circularized light is converted to the S polarized light or the P polarized light. In the present example, the P polarized light applied to the quarter wave plate 13 is converted into a left-handed circularized polarized light. The light beam is further applied to the recording surface of a disc 16 through the hologram 14 which is an aberration correcting means, and the objective 15. The light beam of 635 nm is accurately applied to the recording surface of a DVD 16a having a predetermined distance of about 0.6 mm between the recording surface and the surface of the disc.

The light beam is reflected from the DVD 16a and passes through the objective 15, hologram 14, quarter wave plate 13 and the collimator lens 12. The light beam is converted to a right-handed circularized polarizing light upon reflection, and further rotated by the quarter wave plate 3 to form the S polarized light. One hundred percent of the S polarized light is reflected from the reflecting film of the first beam splitter 11, and 0% thereof is transmitted therethrough as shown by the reference (4) and (2) in the table of FIG. 2a. Thus the S polarized light is applied to the second beam splitter 17.

The beam splitter 17 is provided with a reflecting film having transmitting and reflecting characteristics of the laser beams shown in FIG. 2b. More particularly, the transmittance Tp for a P polarized light of the first beam of 635 nm is 0%, while the reflectance Rp thereof is 100% as shown by references (5) and (7). In the case of S polarized light, the transmittance Ts is 0% while the reflectance Rs is 100% as shown by references (6) and (8). Hence the S polarized light is reflected from the beam splitter 17 and applied to the photodetector 19 through the multiple lens device 18.

The second light beam L2 having the wavelength of 785 nm is emitted from the second laser diode 20. The beam is applied to the beam splitter 17. The transmittance Tp of the P polarized light of the light beam of 785 nm is 100% while the reflection Rp thereof is 0% as shown by the references (5) and (7) in FIG. 2b. On the other hand, the transmittance Ts of the S polarized light is 0% while the reflectance Rs is 100% as shown by the references (6) and (8). Hence only the P polarized light is transmitted through the reflecting film of the second beam splitter 17. The P polarized light of 785 nm is further reflected 100% as shown by the reference (3) of FIG. 2a at the reflecting film of the first beam splitter 11 so as to be applied to the collimator lens 12. The light beam is transmitted to the objective 15 through the quarter wave plate 13 and the hologram 14 in the same manner as the first light beam L1 from the first laser diode 10. The second light beam L2 is accurately applied to the recording surface of the disc when the loaded disc is a CD 16b or a CD-R 16b which both have a distance of about 1.2 mm between the surface of the disc and the recording surface thereof.

The reflected light beam L2, which is a right-handed circularized polarized light, is further rotated to become the S polarized light by the quarter wave plate 13. The S polarized light is reflected from the reflecting films of the first and second beam splitters 11 and 17, thereby changing the directions thereof. Thus the light beam is applied to the photodetector 19 through the multiple lens device 18.

The hologram 14 provided between the quarter wave plate 13 and the objective 15 is described in detail with reference to FIGS. 3 to 5c.

In order to read the DVD 16a having the protection layer thickness of 0.6 mm, the laser beam of the wavelength of 635 nm and a numerical aperture NA of 0.6 is necessary. On the other hand, in order to read the CD 16b and the CD-R having the protection layer thickness of 1.2 mm, the light beam having the wavelength of 785 nm and a numerical aperture NA of 0.45 is necessary. The hologram 14 is capable of selectively correcting the aberration in dependence on the wavelength of the applied light beam so that the objective 15 may be adapted for the two different conditions. In the present embodiment, the hologram 14 functions only when the beam of 785 nm is applied for reproducing the CD or the CD-R.

Figure 3:
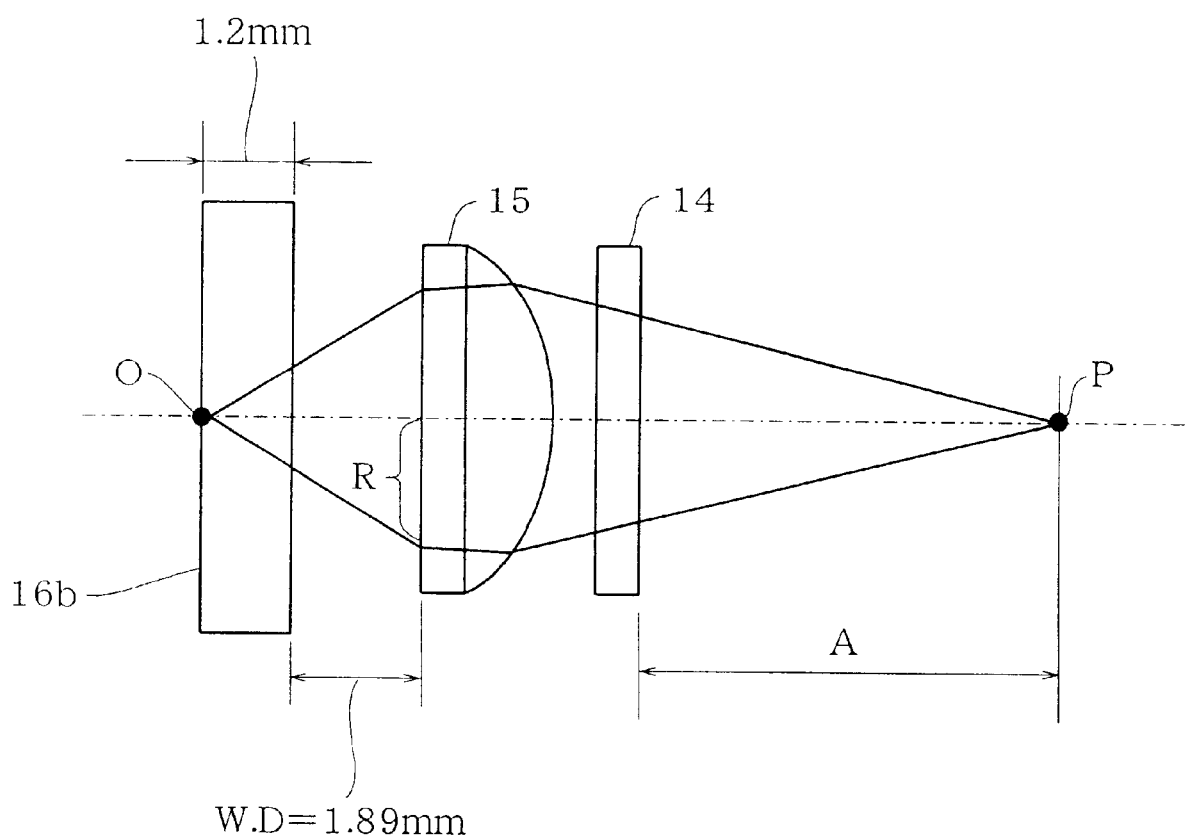
FIG. 3 is a diagram explaining the operation of a hologram provided in the pickup of FIG. 1.
Figure 5:
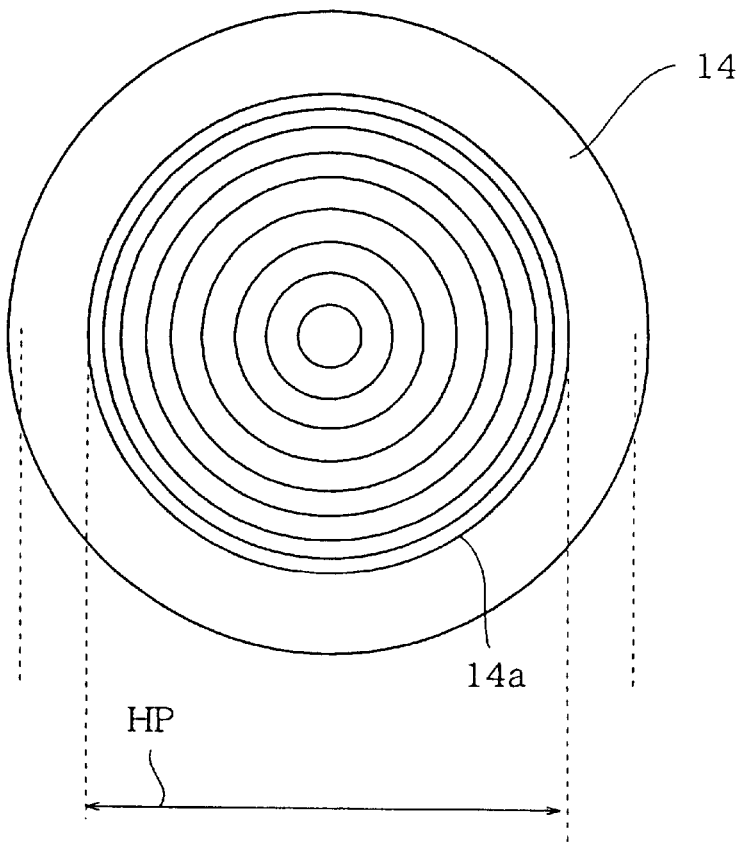
FIGS. 5a and 5b are a plan view and a sectional view of the hologram, respectively.
FIG. 5c is an enlarged diagram of FIG. 5b.
Figure 5:
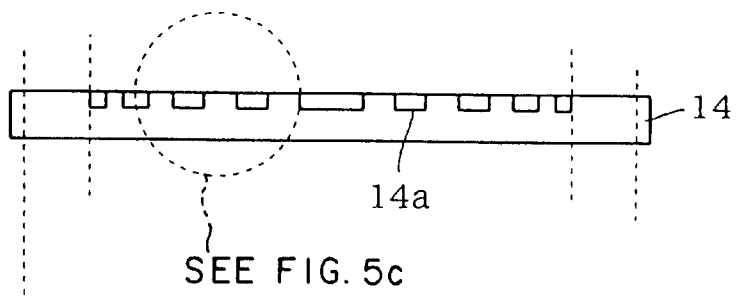
Figure 5:
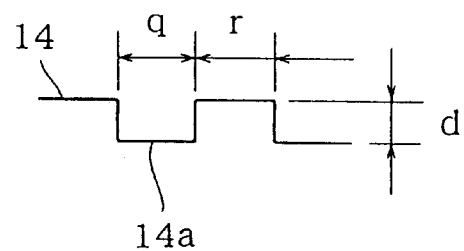

Referring to FIG. 3, the objective 15 is disposed adjacent the CD 16b so that a working distance W.D between the surface of the CD 16b and the opposing surface of the objective is 1.89 mm, and the focal point P of the objective 15 is paraxially formed. When a light beam is reflected from a point O of the recording surface of the CD 16b, it is assumed that a generated wave front aberration is represented by W(R).

In order to convert the wave front having an aberration corresponding to the thickness of the protection layer of 1.2 mm into a plane wave, or a parallel wave, if the distance between the hologram 14 and the focal point P is represented by A, the hologram 14 becomes concentric circle group having a radius R which satisfies the following equation.

$$\sqrt{(R^2+A^2)}-W(R)-A=m\times\lambda \qquad (1)$$

where m is an integer, and λ is the wavelength of the applied light. The circle group comprises a plurality of grooves 14a as shown in FIG. 5a.

More particularly, the equation (1) shows that, regarding the light beam having an aberration and which is reflected from the point O and enters at an arbitrary groove 14a, and the light beam without any aberration which enters the center of the hologram 14 along the optical axis thereof, the wave fronts of the two light beams coincide with each other at the focal point P. Namely, the optical path difference of the light beams corresponds to a product of the wavelength and an integer.

When the hologram 14 having the concentric grooves 14a of the above described condition is formed adjacent the object 15 at the other side of the CD 16b, there is generated an aberration which is opposite in polarity from the aberration caused by the difference of the thicknesses of the protection layers of the DVD 16a and the CD 16b. The aberrations are canceled by each other at the point O so that the light beams without the aberration is generated.

Furthermore, the hologram 14 is capable of selecting light beams of a particular wavelength. That is, the hologram 14 serves as a diffraction grating only to the light beams having the wavelength 785 nm and not to the light beams having the wavelength of 635 nm. In order to impart such a characteristic to the hologram 14, each groove 14a thereof is formed so that the section thereof is a rectangle having a depth d as shown in FIG. 5c. The depth d is so determined that a phase difference φ of 2×n×π, where n is an integer, is obtained when the light beam of 635 nm is applied.

Namely, the intensities of the light diffracted by the hologram 14 is calculated as follows. The intensity $|A_0|^2$ of the zeroth-order main beam is, $$|A_0|^2 = 1 + 2 \times r/q \times (1-\cos \phi)(r/q - 1) \tag{2}$$

where r/q is a duty ratio of the grooves 14a. The phase difference φ is further expressed as, $$\phi = 2 \times \pi \times (N-1) \times d/\lambda$$

where N is an index of refraction the material of the hologram 14. The intensity $|A_0|^2$ of the first-order sub-beams is, $$|A_0|^2 = 2 \times (1-\cos \phi) \times [r/q \times \mathrm{sinc}(_\pi \times r/q)] \tag{3}$$

When the phase difference φ is $$\phi = 2 \times n \times \pi$$

the intensity $A_0$ of the zeroth-order main beam obtained from the equation (2) is 1, and the intensity $A_1$ of the first-order sub-beams obtained from the equation (3) is 0. Namely, diffraction do not occur.

The depth d of the grooves 14a for causing the light beam having the wavelength of 635 nm to generate the phase difference φ of 2×n×π is $$d = \lambda/(N-1) \times n$$

If the index of refraction N the hologram 14, such as glass is 1.511, the depth d is 2.486 μm when n is 2. Hence when the grooves 14a of the hologram 14 has a depth of 2.486 μm, the hologram 14 do not function as a diffraction grating to the light beam of 635 nm.

The intensity $A_0$ of the zeroth-order main beam having the wavelength of 785 nm, and the intensity $A_1$ of the first-order sub-beams thereof are shown in the table in FIG. 4. In the table, the calculated intensities are when duty ratio r/q of the grating is 50%.

As can be seen from the table, in the light beam of 785 nm, 35.1% of the incident light beam becomes the first-order sub-beams. However, the beams passes through the hologram twice, that is, on its way to the CD 16b, and returning therefrom, the utilizing rate of the light beam of 785 nm is actually calculated as 0.351×0.351=0.123, therefore, 12.3%.

As shown in FIG. 5a and 5b, there is provided the hologram 14 as a phase transmission type diffracting grating comprising concentric grooves 14a having various radii R, formed across a range HP corresponding to the numerical aperture NA in the case of the CD, which is about 0.45. Thus the hologram 14 is merely a transparent plate to the light beam of 635 nm. To the light beam of 785 nm, not only the aberration caused by the thickness of the protection layer of the CD is corrected, the numerical aperture of the light beam is restricted. Hence the hologram 14 selectively operates dependent on the wavelength of the applied beam.

Thus in accordance with the present invention, by providing the hologram 14, the objective 15 can be used for reproducing different kinds of disc such as the DVD, CD and CD-R.

The laser chips comprising the semiconductor laser diodes 10 and 20 may be mounted on a single stem to provide a packaged two-wavelength semiconductor laser. When such a packaged laser diode is provided at the position of the laser diode 10 in FIG. 1, the beam splitter 11 need not selectively transmit and reflect the laser beam according to the wavelength thereof. The beam splitter 11 simply need to have transmitting and reflecting characteristics depending on the direction of the wave front, namely whether the light beam is the P polarized light or the S polarized light. Moreover, the beam splitter 17 can be obviated, thereby disposing a mirror in its place. Alternatively, the photodetector 19 may be provided at the position of the beam splitter 17 so that the number of the devices in the optical pickup is reduced.

Figure 6:
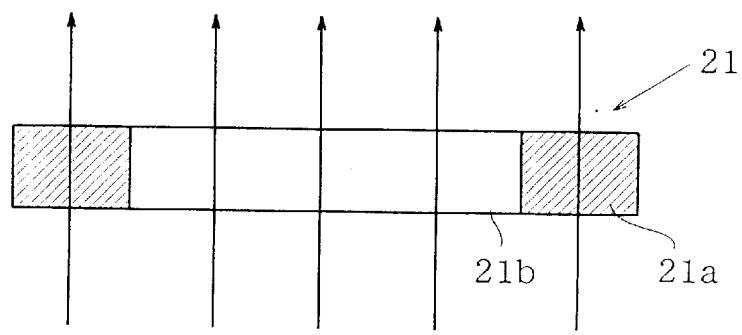
FIGS. 6a and 6b are sectional views of an aberration correcting device, explaining the operation thereof, provided in a second embodiment of the present invention.
FIG. 6c is a plan view showing the aberration correcting device of FIGS. 6a and 6b.
Figure 6:
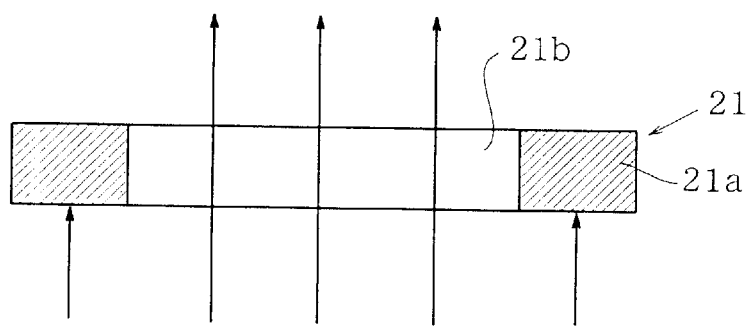
Figure 6:
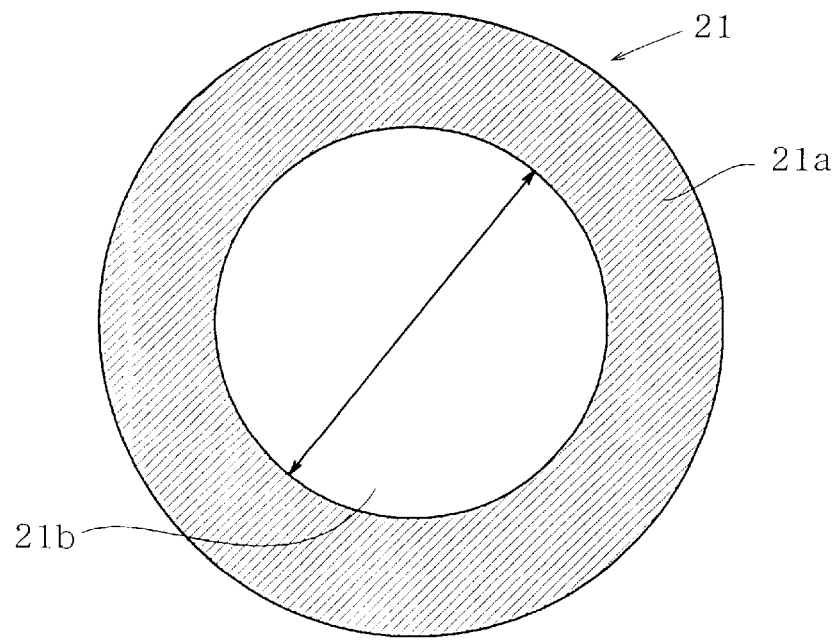

FIGS. 6a to 6c show an aberration correcting glass disc 21 disposed instead of the hologram 14 in the second embodiment of the present invention. In general, the spherical aberration generated on the recording surface of the disc is proportional to the fourth power of the numerical aperture NA. Accordingly, when the numerical aperture NA is reduced, the generation of the aberration can be decreased in proportion to the fourth power of the reduction.

More particularly, the glass disc 21 has an outer peripheral ring portion 21a, shown as the hatched area in FIGS. 6a to 6c, and a circular center portion 21b. The ring portion 21a is made of a plurality of layers of transparent dielectric thin films of such material as silicon. On the other hand, the center portion 21b is a transparent plate without the dielectric films, having a diameter corresponding to the numerical aperture of the CD and the CD-R, namely 0.45.

As shown in FIG. 6a, the glass disc 21 transmits the light beams of 635 nm through the ring portion 21a and the center portion 21b. However, the ring portion 21a serves to block the light beams of 785 nm so that the beams are transmitted only through the center portion 21b as shown in FIG. 6b.

Hence, by restricting the area of the aperture in the light beam having the wavelength of 785 nm, even when the optical pickup having an objective designed to prevent the spherical aberration at the reproduction of the DVD is used to reproduce the CD or the CD-R, the spherical aberration can be reduced in proportion to the fourth power of the numerical aperture. Thus, the pickup can be preferably used in a compatible reproducing system.

Figure 7:
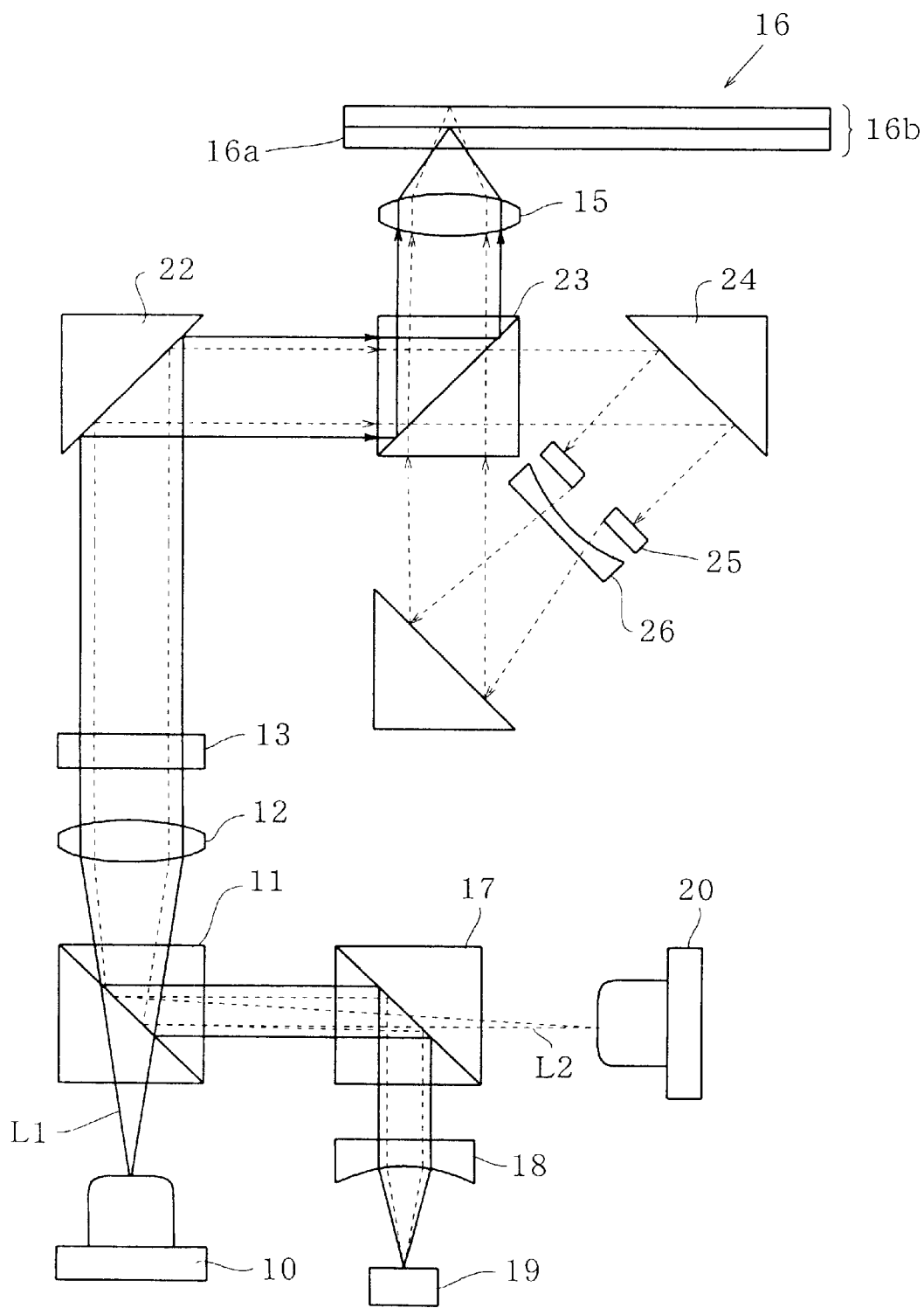
FIG. 7 is a diagram showing a third embodiment of the optical pickup.

Referring to FIG. 7, the third embodiment of the present invention is provided with a light blocking plate 25 and an aspherical concave lens 26 for correcting the aberration. Furthermore, mirrors 22 and 24 and a third beam splitter 23 for leading the light beam of 785 nm to the light blocking plate 25 and the aspherical concave lens 26, and a mirror 27 for leading the beam applied thereto, back to the objective 15 are provided.

Referring to FIG. 7, as shown by the solid line, the light beam L1 from the first laser diode 10 is applied to the mirror 22 through the first beam splitter 11, collimator lens 12, and the quarter wave plate 13. The light beam reflected from the mirror 22 is further reflected at the third beam splitter 23. The third beam splitter 23 has the transmitting and reflecting characteristics adapted to reflect the light beam of 635 nm and to transmit the light beam of 785 nm. The light beam emitted from the first laser diode 10 is further applied to the recording surface of the DVD 16a through the objective 15.

The light beam is reflected from the DVD 16a and passes through the objective 15, reflected at the beam splitter 23 and the mirror 22, and further transmitted through the quarter wave plate 13 and the collimator lens 12. The light beam is reflected at the beam splitters 11 and 17 so as to be applied to the photodetector 19 through the multiple lens device 18.

The light beam L2 having the wavelength of 785 nm emitted from the second laser diode 20 is transmitted through the beam splitter 17 as shown by the dotted line, reflected at the first beam splitter 11 so as to be applied to the collimator lens 12, quarter wave plate 13, and the mirror 22. The light reflected by the mirror 22 is transmitted through the third beam splitter 23 and reflected from the mirror 24. The reflected light beam is transmitted through the light blocking plate 25 and the aspherical concave lens 26 to the mirror 27.

The light blocking plate 25 has a circular transmitting portion corresponding to the numerical aperture NA of 0.45 for the CD. Hence, the light beam applied to the light blocking plate is transmitted only through the circular transmitting portion. The aspherical concave lens 26 is so designed as to generate a spherical aberration having the opposite polarity as the spherical aberration caused by the difference in the protection layers of the CD and the DVD.

The light beam which is thus corrected of aberration and restricted of the aperture, is reflected from the mirror 27 and applied to the CD 16b through the objective 15 and the beam splitter 23. The light beam reflected from the CD 16b is applied to the photodetector 19 in the same manner as the light beam of the wavelength of 635 nm, Thus, in accordance with the present embodiment, the aberration generated by the light blocking plate and the aspherical concave lens 26 cancels the aberration generated when the light is focused on the recording surface of the CD or the CD-R, thereby forming a light beam appropriate for reproducing the CD and the CD-R.

From the foregoing, it will be understood that the optical pickup of the present invention is provided with means comprising the least number of parts, for correcting aberration in the light beam which is caused by the difference in the protection layers of different kinds of discs. Hence the optical pickup can be used for reproducing different kinds of discs.

While the invention has been described in conjunction with preferred specific embodiment thereof, it will be understood that this description is intended to illustrate and not limit the scope of the invention, which is defined by the following claims.

What is claimed is:

1. An optical pickup for reproducing information recorded on optical recording mediums including a first recording medium having a predetermined first distance from a surface of the medium to an information recording surface, and a second recording medium having a predetermined second distance from the surface of the medium to an information recording surface which is different from the first distance comprising:

a first light surface for emitting a first light beam having a first wavelength;

a second light source for emitting a second light beam having a second wavelength;

an objective for focusing the first light beam on the information recording surface of the first recording medium, and for focusing the second light beam on the information recording surface of the second recording medium; and a hologram having a plurality of concentric circular grooves and provided in an optical path between the first and second light sources and the objective, wherein a depth of the groove is determined so as to cause diffraction to only one of the first and second light beams, so that the first light beam and the second light beam are focused on the information recording surfaces of the first and second recording mediums, respectively.

2. The optical pickup according to claim 1 wherein the hologram means has means for generating an aberration for canceling the aberrations generated in the second light beam.

3. The optical pickup according to claim 1 wherein the hologram means is a phase transmission type diffraction grating having a plurality of grooves each having an approximately rectangular cross section, a depth of the groove is in proportion to $\lambda/(N-1)$ where, $\lambda$ is a wavelength, N is an index of refraction.

4. The optical pickup according to claim 1 wherein the hologram further comprises a beam splitter for reflecting the first light beam and for transmitting the second light beam, means for generating an aberration in the second light beam after the transmission of the beam splitter, and an optical element for leading the second light beam from the generating means to the objective.

5. The optical pickup according to claim 1 wherein the hologram is an annular slit member for limiting aperture of the second light beam.

6. The optical pickup according to claim 1, wherein said hologram correcting aberrations generated in the second light beam when the second light beam is reflected from said second recording medium.

7. The optical pickup according to claim 1, wherein said hologram generating an aberration which is opposite from an aberration caused by the difference of the second distance from the first distance.

8. The optical pickup according to claim 1, wherein the hologram generating an aberration which is opposite from an aberration caused by the second light beam being reflected from the second recording medium.

* * * * *